(12) United States Patent
Kruglick

(10) Patent No.: US 8,989,395 B2
(45) Date of Patent: Mar. 24, 2015

(54) AUDIO FINGERPRINT DIFFERENCES FOR END-TO-END QUALITY OF EXPERIENCE MEASUREMENT

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 657 days.

(21) Appl. No.: 13/127,798

(22) PCT Filed: Dec. 7, 2010

(86) PCT No.: PCT/US2010/059300
§ 371 (c)(1),
(2), (4) Date: May 5, 2011

(87) PCT Pub. No.: WO2012/078142
PCT Pub. Date: Jun. 14, 2012

(65) Prior Publication Data
US 2012/0140935 A1    Jun. 7, 2012

(51) Int. Cl.
*H04R 29/00* (2006.01)
*G10L 25/60* (2013.01)
*H04L 29/06* (2006.01)
*H04M 3/22* (2006.01)
*H04W 24/08* (2009.01)

(52) U.S. Cl.
CPC .............. *G10L 25/60* (2013.01); *H04L 65/80* (2013.01); *H04L 65/1083* (2013.01); *H04M 3/2236* (2013.01); *H04W 24/08* (2013.01)
USPC ............................................. 381/56; 700/94

(58) Field of Classification Search
CPC ................ H04R 29/00; G06F 17/00

USPC ............ 381/56, 91, 122; 700/94; 704/200.1, 704/273

See application file for complete search history.

(56) References Cited

U.S. PATENT DOCUMENTS

| | | | |
|---|---|---|---|
| 5,918,223 A | 6/1999 | Blum et al. | |
| 6,373,953 B1* | 4/2002 | Flaks | 381/94.7 |
| 7,277,766 B1 | 10/2007 | Khan et al. | |
| 2004/0078575 A1 | 4/2004 | Morten et al. | |
| 2005/0065976 A1 | 3/2005 | Holm et al. | |
| 2005/0143974 A1 | 6/2005 | Joly | |
| 2005/0193016 A1* | 9/2005 | Seet et al. | 707/104.1 |
| 2005/0197724 A1* | 9/2005 | Neogi | 700/94 |
| 2005/0289066 A1 | 12/2005 | Weare | |
| 2006/0020958 A1 | 1/2006 | Allamanche et al. | |
| 2007/0253558 A1* | 11/2007 | Song et al. | 381/56 |

(Continued)

FOREIGN PATENT DOCUMENTS

| | | |
|---|---|---|
| CN | 101002254 A | 7/2007 |
| DE | 102004036154 B3 | 12/2005 |

(Continued)

OTHER PUBLICATIONS

Cheung, Ken, Google Nexus One, Motorola Droid Drive MEMS Microphone Market, in EDA Geek Components, Research, Wireless, published Feb. 2, 2010, accessed online on Oct. 9, 2012 via http://edageek.com/2010/02/02/active-noise-cancellation/.

(Continued)

*Primary Examiner* — Disler Paul
(74) *Attorney, Agent, or Firm* — Brundidge & Stanger, P.C.

(57) ABSTRACT

Implementations and techniques for audio fingerprint differences for end-to-end quality of experience measurement are generally disclosed.

17 Claims, 6 Drawing Sheets

(56) References Cited

U.S. PATENT DOCUMENTS

| | | | | |
|---|---|---|---|---|
| 2009/0157391 | A1* | 6/2009 | Bilobrov | 704/200.1 |
| 2010/0067709 | A1* | 3/2010 | Seefeldt | 381/56 |
| 2010/0146445 | A1* | 6/2010 | Kraut | 715/821 |
| 2011/0087135 | A1* | 4/2011 | Ferzli et al. | 600/586 |
| 2012/0076310 | A1* | 3/2012 | DeBusk et al. | 381/56 |
| 2013/0138442 | A1* | 5/2013 | Wang et al. | 704/270 |

FOREIGN PATENT DOCUMENTS

| | | | |
|---|---|---|---|
| JP | 2008-511844 | A | 4/2008 |
| JP | 2008-547145 | A | 12/2008 |
| JP | 2012-516591 | A | 7/2012 |
| KR | 1020070059863 | A | 6/2007 |
| WO | 2006/136300 | A1 | 12/2006 |
| WO | 2009/088431 | A1 | 7/2009 |
| WO | 2010/022303 | A1 | 2/2010 |
| WO | 2010022303 | A1 | 2/2010 |
| WO | 2010/086020 | A1 | 8/2010 |

OTHER PUBLICATIONS

Australian Patent Office, International Search Report and Written Opinion of PCT/US2010/059300, Mar. 10, 2011, Australia.

Cano, Pedro, et al., A Review of Algorithms for Audio Fingerprinting, Workshop on Multimedia Signal Processing, 2002, accessed via CiteSeerX on May 2, 2011 at http://mtg.upf.edu/files/publications/MMSP-2002-pcano.pdf.

Seo, Jin S., et al., Audio fingerprinting based on normalized spectral subband centroids, Proceedings of the IEEE International Conference on Acoustics, Speech, and Signal Processing 2005 (ICASSP '05), Mar. 18-23, 2005.

Kudrle, Sara, Media fingerprinting; managing content, security and quality, Miranda Technologies, Grass Valley, California, presented on Apr. 12, 2010 at the National Association of Broadcasters Show in Las Vegas, NV.

Son, Wooram, et al., Sub-fingerprint masking for a robust audio fingerprinting system in a real-noise environment for portable consumer devices, IEEE Transactions on Consumer Electronics, vol. 56, No. 1, Feb. 2010, pp. 156-160.

Search Report issued in corresponding European application No. 10860533 on May 21, 2014.

Cano. P. et al., "Audio Fingerprinting: Concepts And Applications," Proceedings of 1st International Conference on Fuzzy Systems and Knowledge Discovery, pp. 5, 2002.

Keyhl, M. et al., "Maintaining Sound Quality-Experiences and Constraints of Perceptual Measurements in Today's and Future Networks," 98th AES Convention, 1995.

* cited by examiner

500 A computer program product.

502 A signal bearing medium.

504 at least one of one or more instructions for receiving a first audio fingerprint generated from a digital audio signal;

one or more instructions for determining a Quality of Experience (QoE) metric value based at least in part on a comparison between the first audio fingerprint and a second audio fingerprint generated from the digital audio signal;

one or more instructions for determining a QoE metric value based at least in part on a comparison between a third audio fingerprint and at least one of the first audio fingerprint and the second audio fingerprint; or one or more instructions for determining a QoE metric value based at least in part on a comparison between perceptual characteristics of the first audio fingerprint and perceptual characteristics of the second audio fingerprint.

506 a computer-readable medium. | 508 a recordable medium. | 510 a communications medium.

FIG. 5

AUDIO FINGERPRINT DIFFERENCES FOR END-TO-END QUALITY OF EXPERIENCE MEASUREMENT

BACKGROUND

Unless otherwise indicated herein, the approaches described in this section are not prior art to the claims in this application and are not admitted to be prior art by inclusion in this section.

Quality of Service (QoS) metrics were originally developed and enhanced for use with switching landline telephony. Such QoS metrics were well characterized and formed an important tool for vendors in providing service. The recent dramatic increase in Voice over IP (VoIP) telephony services has markedly changed landline telephony, and recent 3G/4G advances are making it possible to use a phone's internet connection for VoIP in a mobile environment. Unfortunately, most of these VoIP applications do not include the built-in end-to-end QoS monitoring mechanisms of legacy landline systems, and also lack the industry associations and groups that developed the previous generation of standards for landline systems. Consequently, it may be difficult for users and/or providers to measure the QoS and the overall Quality of Experience (QoE) for VoIP calls on mobile devices.

Watermarking is a common technique that may be used to monitor data degradation. Typically, watermarks are added to a data stream and data degradation may be inferred from changes observed in the watermarks as the data signals transit a network. However, watermarking requires alteration of the data signals and provides for only indirect assessments of data degradation.

Audio or acoustic fingerprinting techniques may be used to characterize and/or protect audio content without requiring alteration of the data signals. An audio fingerprint may provide a condensed digital summary, deterministically generated directly from an audio signal and may generally be used to identify an audio sample or to quickly locate similar items in an audio database.

SUMMARY

In accordance with some implementations, methods for determining mobile Quality of Experience may generally include receiving an audio fingerprint generated from a digital audio signal. A Quality of Experience (QoE) metric value may then be determined based at least in part on a comparison between the audio fingerprint and another audio fingerprint generated from the digital audio signal at a recipient of the digital audio signal.

In accordance with some implementations, articles including a computer program product are also generally described where the products store instructions that, if executed, may result in determining mobile Quality of Experience by receiving an audio fingerprint generated from a digital audio signal and determining a Quality of Experience (QoE) metric value based at least in part on a comparison between the audio fingerprint and another audio fingerprint generated from the digital audio signal at a recipient of the digital audio signal.

In accordance with some implementations, systems are generally described that may include one or more modules configured to receive an audio fingerprint generated from a digital audio signal. The one or more modules may then be configured to determine a Quality of Experience (QoE) metric value based at least in part on a comparison between the audio fingerprint and another audio fingerprint generated from the digital audio signal, where the other audio fingerprint was generated at a recipient of the digital audio signal.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The subject matter of the present disclosure is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 5 is an illustration of an example computer program product; and

DETAILED DESCRIPTION

Figure 1:
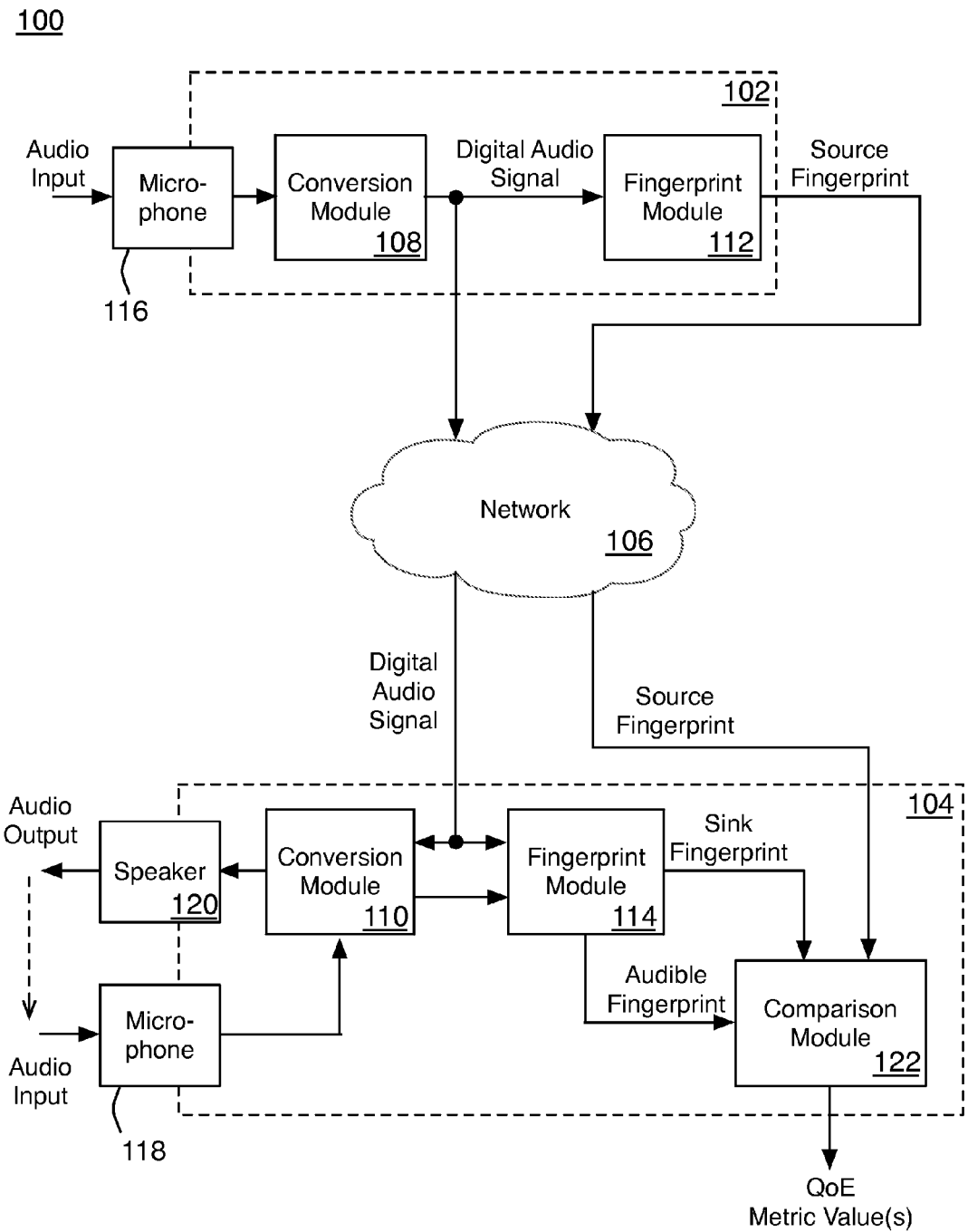
FIG. 1 is an illustrative diagram of an example system.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the embodiments of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems generally related to employing audio fingerprinting to provide Quality of Service (QoS) metrics in mobile communications systems.

In accordance with various implementations of the present disclosure, audio fingerprints may be generated at both an originating communication device and at a destination communication device and then the difference between the audio fingerprints may be generated. Divergence between such audio fingerprints may provide a measure of the deviation from an optimal level of service and thus may provide one or more quantifiable QoE/QoS metrics (hereinafter "QoE" metrics) relating to codecs, compression, and/or channel issues. In some examples, an audio fingerprint may be generated by sampling audio output to facilitate to-the-ear QoE measurements. In some examples, audio fingerprints may be generated at various locations in a communication network including at intermediate network nodes such as servers. Moreover, in various examples audio fingerprints may be generated during and/or after a particular communication event.

In accordance with various implementations of the present disclosure, an originating fingerprint or "origin" fingerprint may be calculated or generated at a mobile device's handset when a user's voice is being capture for transmission. The origin fingerprint may then be transmitted, along with the audio signal, to a receiving handset using, for example, Voice over Internet Protocol (VoIP) techniques. In some examples the origin fingerprint may be provided separately from the corresponding audio signal. In various implementations, an audio fingerprint of the received audio signal or "received" fingerprint may be generated at the receiving handset. In some examples, a received fingerprint may be calculated just before conversion of a received audio signal from digital to analog signal form. The original fingerprint may then be compared to the received fingerprint and any difference between the fingerprints may provide one or more QoE measurements of characteristics such as transmission medium quality, coding effects, etc.

In accordance with various implementations of the present disclosure, mobile devices incorporating one or more integrated microphones may be used to capture audio signals from a receiving device's speaker(s). In such implementations an audio fingerprint of a receiving device's physically audible signal or "audible" fingerprint may be generated and then compared to the original fingerprint and/or the received fingerprint. Such comparison may provide for QoE measurements capable of discerning between a bad connection or handset, a loud environment, etc.

In accordance with various implementations of the present disclosure, service providers and/or users may compare original, received and/or audible audio fingerprints to obtain various QoE metrics. In various examples a service provider may generate audio fingerprints at various points along a network path and may compare various ones of those "intermediate" fingerprints to isolate service issues with respect to different network segments, components, etc. In some examples a difference of zero (e.g., original fingerprint identical to received fingerprint) may indicate an acceptable transmission while a non-zero difference may indicate a sub-optimal transmission. In some examples, audio fingerprints may be compared in near real-time context and/or may be compared post process by using the data capabilities of the handsets. To facilitate synchronization, packet timing and identification may be used in some implementations. In various examples, a non-human hearing range synchronization tone may be employed to aid synchronization between audio fingerprints.

In accordance with various implementations of the present disclosure, comparison of audio fingerprints may include a direct comparison of binary representations of the fingerprints and/or may include a distance measure between fingerprint feature vectors. In some examples, fingerprint feature vectors may specify perceptual characteristics of an audio signal such as average zero crossing rate, estimated tempo, average spectrum, spectral flatness, prominent tones across a set of bands, and/or bandwidth.

FIG. 1 illustrates portions of an example system 100 in accordance with at least some embodiments of the present disclosure. System 100 includes a source device 102 and a destination or sink device 104. Devices 102 and 104 may be any type of device capable of generating, receiving and/or transmitting digital audio signals over a network 106 such as a cellular communications network. For example, in various implementations, Devices 102 and 104 may be cellular telephone handsets. Devices 102 and 104 include respective conversion modules 108 and 110 capable of converting various signals between analog and digital formats. Further, devices 102 and 104 also include respective fingerprint modules 112 and 114 capable of generating audio fingerprints as will be described in further detail below.

Source device 102 also includes a microphone 116 capable of converting audio input (e.g., as provided by a user's voice) into an analog audio signal. Module 108 may then convert the analog audio signal into a digital audio signal. The digital audio signal may then be communicated to destination device 104 over network 106 using, for example, VoIP techniques. Fingerprint module 112 may produce an audio fingerprint ("source" fingerprint) in response to the digital audio signal provided by module 108. It may be recognized that devices 102 and 104 may include additional components and/or modules such as transmit/receive modules, memory components, processors, antenna(s) etc. that have been omitted from FIG. 1 in the interest of clarity.

In various implementations, fingerprint modules 112 and 114 may be any combination of software, firmware and/or hardware capable of producing a source fingerprint using any one of various known audio fingerprinting techniques. In various implementations, modules 112 and/or 114 may be implemented, at least in part, by software and/or firmware algorithms executing on one or more processor core(s) such as one or more processor core(s) of a Digital Signal Processor (DSP). Source device 102 may also communicate the source fingerprint to destination device 104 over network 106.

Destination device 104 includes a microphone 118 capable of converting audio input (e.g., as provided by a user's voice) into an analog audio signal. Module 110 may then convert the analog audio signal into a digital audio signal that may be provided to fingerprint module 114. Further, module 110 may convert the digital audio signal received from source device 102 into an analog audio signal that may be used by a speaker 120 to generate audio output (e.g., a reproduction of the voice of a user of device 102 as conveyed by the digital audio signal). In turn, the audio output of speaker 120 may be captured by microphone 118 and converted into a digital audio signal by module 110. Module 110 may then provide that digital audio signal to fingerprint module 114.

Fingerprint module 114 of device may generate an audio fingerprint ("sink" fingerprint) from the digital audio signal received from source device 102. Module 114 may also generate another audio fingerprint ("audible" fingerprint) from the digital audio signal obtained from the audio input captured by microphone 118. The source fingerprint and sink fingerprint may be provided to a comparison module 122 where they may be compared to each other to produce one or more QoE metric values as will be described in further detail below. In addition, comparison module 122 may also receive the audible fingerprint and may compare it to one or both of the source fingerprint and/or sink fingerprint to produce one or more QoE metric values as will also be described in further detail below.

Figure 2:
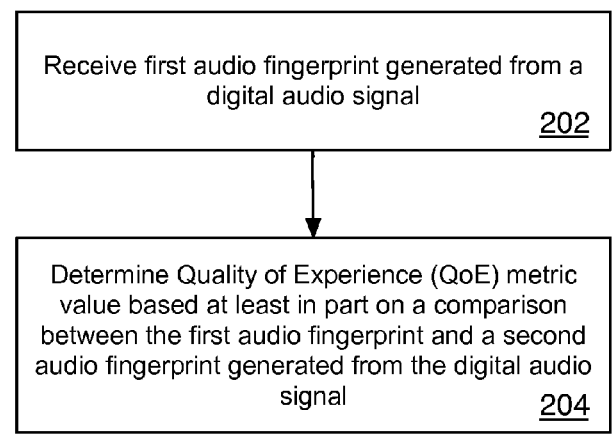
FIG. 2 is an illustration of an example process.

FIG. 2 illustrates a flow diagram of an example process 200 according to various implementations of the present disclosure. Process 200 may include one or more operations, functions or actions as illustrated by one or more of blocks 202 and/or 204. Process 200 may begin at block 202.

At block 202, an audio fingerprint may be received where that audio fingerprint was generated from a digital audio signal. In some examples, referring to FIG. 1, block 202 may involve receiving, at device 104, a source fingerprint generated by device 102. Fingerprint module 112 may use any of a number of known fingerprinting techniques to generate the source fingerprint from a digital audio signal. In some examples, the digital audio signal may be at least part of a VoIP signal.

In undertaking fingerprint generation several signal processing functions may be performed. Initially the digital audio signal, represented as a time series of intensity values, may be preprocessed by conversion into a standard format such as a 16-bit Pulse-code Modulation (PCM) format. Other preprocessing such as mono averaging of left and right channels, band-pass filtering etc., may also be undertaken. The digital audio signal may then be segmented into a series of frames that may, or may not, overlap. The frames may then be transformed from the time domain to the frequency domain using various transforms such as a Fast Fourier Transform (FFT), a Discrete Fourier Transform (DFT), a Haar Transform, a Walsh-Hadamard transform, etc.

Generating the fingerprint may then involve extracting one or more features from the signal frames. In some implementations the extracted features may be perceptual characteristics such as, but not limited to, average zero crossing rate, estimated tempo, average spectrum, spectral flatness, prominent tones across one or more spectral bands, and/or bandwidth. For example, a feature corresponding to spectral flatness may be obtained by estimating a tone-like or noise-like quality for a band in a frame's signal spectrum. In another example, an extracted feature may include an ordered list of band indices having prominent tones in a frame.

The generated fingerprint may include one or more features arranged in one or more feature vectors. Further, a fingerprint may be quantized. For example, vectors of a fingerprint may be binary encoded. Moreover, a fingerprint may be provided in compact form by clustering feature vectors into sequences and then approximating the feature vectors with representative code vectors associated with a codebook.

At block 204 a QoE metric value may be determined based at least in part on a comparison between the audio fingerprint received at block 202 and a second audio fingerprint generated from the digital audio signal where the second audio fingerprint was generated at a device that received the digital audio signal. In some examples, referring to FIG. 1, block 204 may involve device 104 employing comparison module 112 to compare a source fingerprint received from device 102 to a sink fingerprint where device 104 has used fingerprint module 114 to generate the sink fingerprint from the digital audio signal received from device 102.

In various implementations, comparing fingerprints at block 204 may include determining a distance metric between fingerprint feature vectors where the distance metric may provide a measure of the similarity of various feature vectors being compared. For example, for quantized feature vectors a Manhattan distance or a Hamming distance may be determined. Subsequently, a QoE metric may be derived by comparing the distance metric to a threshold value. For example, in various implementations, if the distance metric meets or exceeds a threshold value, and hence the one or more feature vectors of the fingerprints being compared may be considered to differ significantly, then a corresponding QoE metric may be assigned a FAILED value. On the other hand, if the distance metric falls below the threshold value, and hence the one or more feature vectors of the fingerprints being compared may be considered to be similar, then a corresponding QoE metric may be assigned a PASS value.

Figure 3:
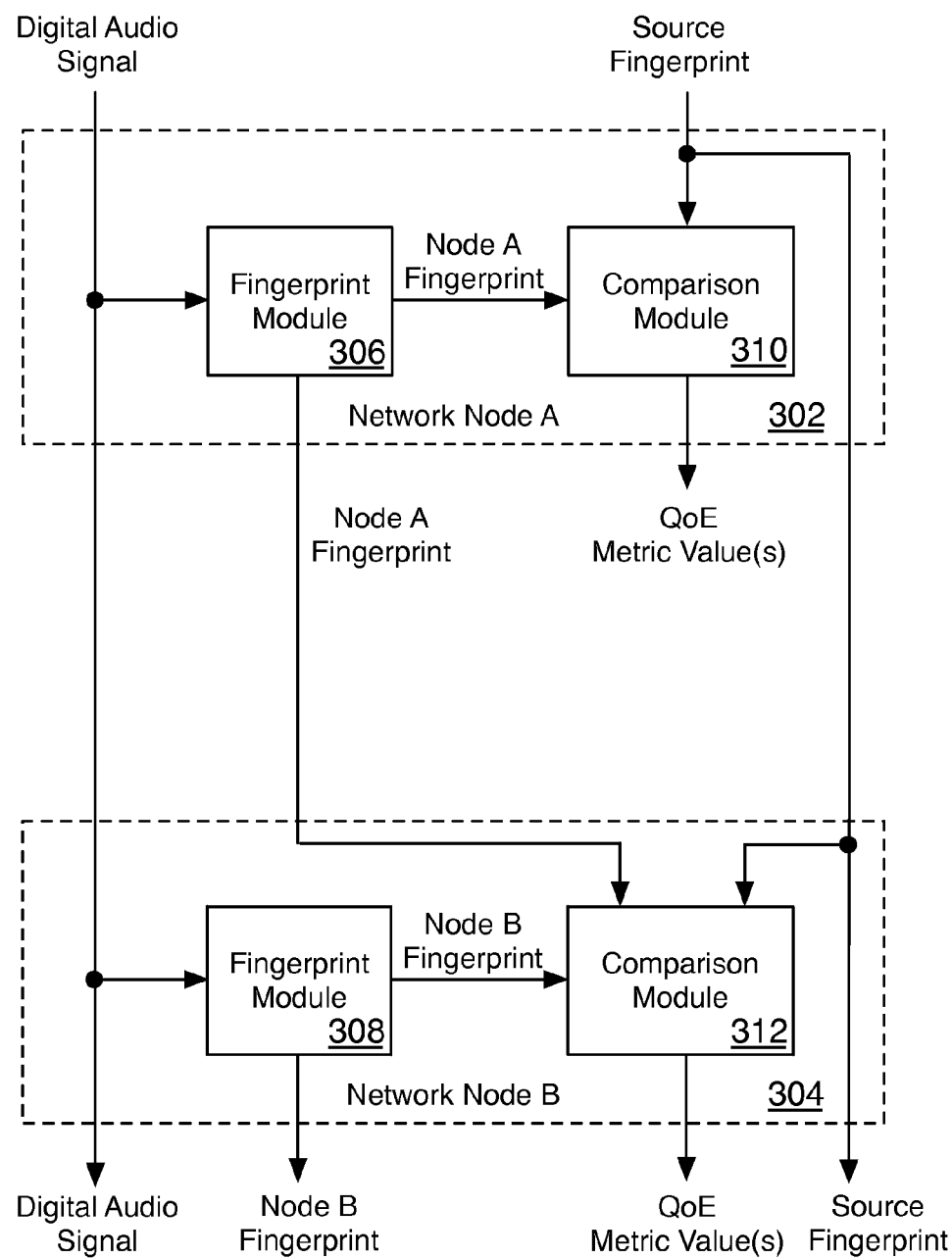
FIG. 3 is an illustrative diagram of another example system.

While implementations of process 200 have been described above in the context of example system 100 of FIG. 1, in various implementations process 200 may be implemented in a variety of contexts. For instance, FIG. 3 illustrates portions of another example network 300 in accordance with at least some embodiments of the present disclosure. Network 300 may be any type of network such as a cellular communications network. Network 300 includes a first network node (node "A") 302 and a second network node (node "B") 304. Nodes 302 and 304 may be any type of network node capable of receiving and/or transmitting digital audio signals over network 300. For example, in various implementations, nodes 302 and/or 304 may be network servers, network gateways etc. It may be recognized that nodes 302 and/or 304 may include additional components and/or modules such as transmit/receive modules, memory components, processors etc. that have been omitted from FIG. 3 in the interest of clarity.

Nodes 302 and 304 include respective fingerprint modules 306 and 308 capable of generating audio fingerprints as described herein. In various implementations, fingerprint modules 306 and/or 308 may be any combination of software, firmware and/or hardware capable of producing a source fingerprint using any one of various known audio fingerprinting techniques. In various implementations, modules 306 and/or 308 may be implemented, at least in part, by software and/or firmware algorithms executing on one or more processor core(s) such as one or more processor core(s) of a Digital Signal Processor (DSP).

Node 302 may receive a digital audio signal and may use fingerprint module 306 to generate a fingerprint of that signal ("node A fingerprint") as described herein. Node 302 may also receive a source fingerprint that has been generated from the digital audio signal by another device such as another network node or a device that generated the digital audio signal. Node 302 may then use a comparison module 310 to compare the node A fingerprint to the source fingerprint to generate one or more QoE metric values as described herein. Node 302 may convey the digital audio signal, the node A fingerprint and/or the source fingerprint to node 304.

Node 304 may receive the digital audio signal and may use fingerprint module 308 to generate a fingerprint of that signal ("node B fingerprint") as described herein. Node 304 may also receive the source fingerprint and the node A fingerprint. Node 304 may then use a comparison module 312 to compare the node B fingerprint to the source fingerprint to generate one or more QoE metric values as described herein. In addition, node 304 may also use module 312 to compare the node B fingerprint to the node A fingerprint to generate one or more QoE metric values as described herein.

While FIG. 3 depicts node 302 as being directly communicatively coupled to node 304, it may be recognized that there may be one or more intervening network nodes (not shown) communicatively coupling node 302 to node 304. In addition, while FIG. 3 depicts a digital audio signal being communicated between nodes 302 and 304, in some examples the digital audio signal may be converted into an analog format for transmission between nodes 302 and 304 and, hence, node 302 and/or 304 may include conversion modules (not shown) for converting the digital audio signal to an analog audio signal and vice versa.

Figure 4:
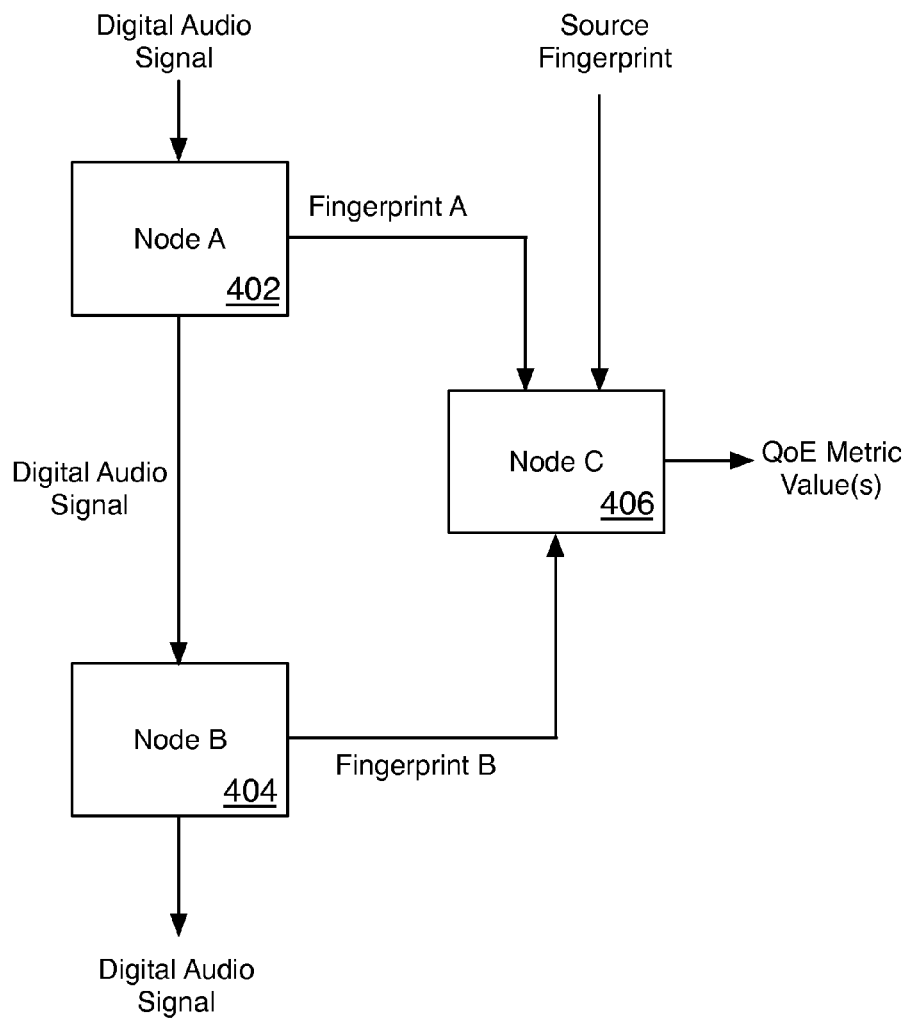
FIG. 4 is an illustrative diagram of another example system.

FIG. 4 illustrates portions of another example network 400 in accordance with at least some embodiments of the present disclosure. Network 400 may be any type of network such as a cellular communications network. Network 400 includes a first network node (node "A") 402, a second network node (node "B") 404 and a third node (node "C") 406. Nodes 402, 404 and 406 may be any type of network node capable of receiving and/or transmitting digital audio signals over network 400. For example, in various implementations, nodes 402, 404 and/or 406 may be network servers, network gateways etc.

In the example of system 400, each of nodes 402 and 404 may employ fingerprint modules (not shown) to generate corresponding fingerprints from a digital audio signal as described herein. Further, node 406 may receive a source fingerprint in addition to respective fingerprints from nodes 402 and 404 and may employ one or more comparison modules (not shown) to generate one or more corresponding QoE metric values as described herein. For instance, node 406 may receive fingerprints from both of nodes 402 and 404 and may generate distinct QoE metric values by separately comparing the respective node fingerprints to a source fingerprint and/or by comparing the node fingerprints to each other.

It may be recognized that nodes 402, 404 and/or 406 may include additional components and/or modules such as transmit/receive modules, memory components, processors etc. that have been omitted from FIG. 4 in the interest of clarity. While FIG. 4 depicts nodes 402, 404 and 406 as being directly communicatively coupled to one another, it may be recognized that there may be one or more intervening network nodes (not shown) communicatively coupling the various nodes of FIG. 4 to one another. For instance, node 406 may be a server located remotely from nodes 402 and 404, which may be respective network gateways separated from each other by one or more intervening nodes.

FIG. 5 illustrates an example computer program product 500 arranged in accordance with at least some examples of the present disclosure. Program product 500 may include a signal bearing medium 502. Signal bearing medium 502 may include one or more instructions 504 that, when executed by, for example, a processor, may provide the functionality described above with respect to FIG. 2. Thus, for example, referring to the system of FIGS. 1 and 3, one or more of devices 102, 104 and/or nodes 302 and/or 304 may undertake one or more of the blocks shown in FIG. 2 in response to instructions 504 conveyed by medium 502.

In some implementations, signal bearing medium 502 may encompass a computer-readable medium 506, such as, but not limited to, a hard disk drive, a Compact Disc (CD), a Digital Versatile Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, referring to the system of FIG. 1, program product 500 may be wirelessly conveyed to device 102 by signal bearing medium 502, where signal bearing medium 502 is conveyed to device 108 by a wireless communications medium 510 (e.g., an wireless communications medium conforming with the 802.11 standard).

Figure 6:
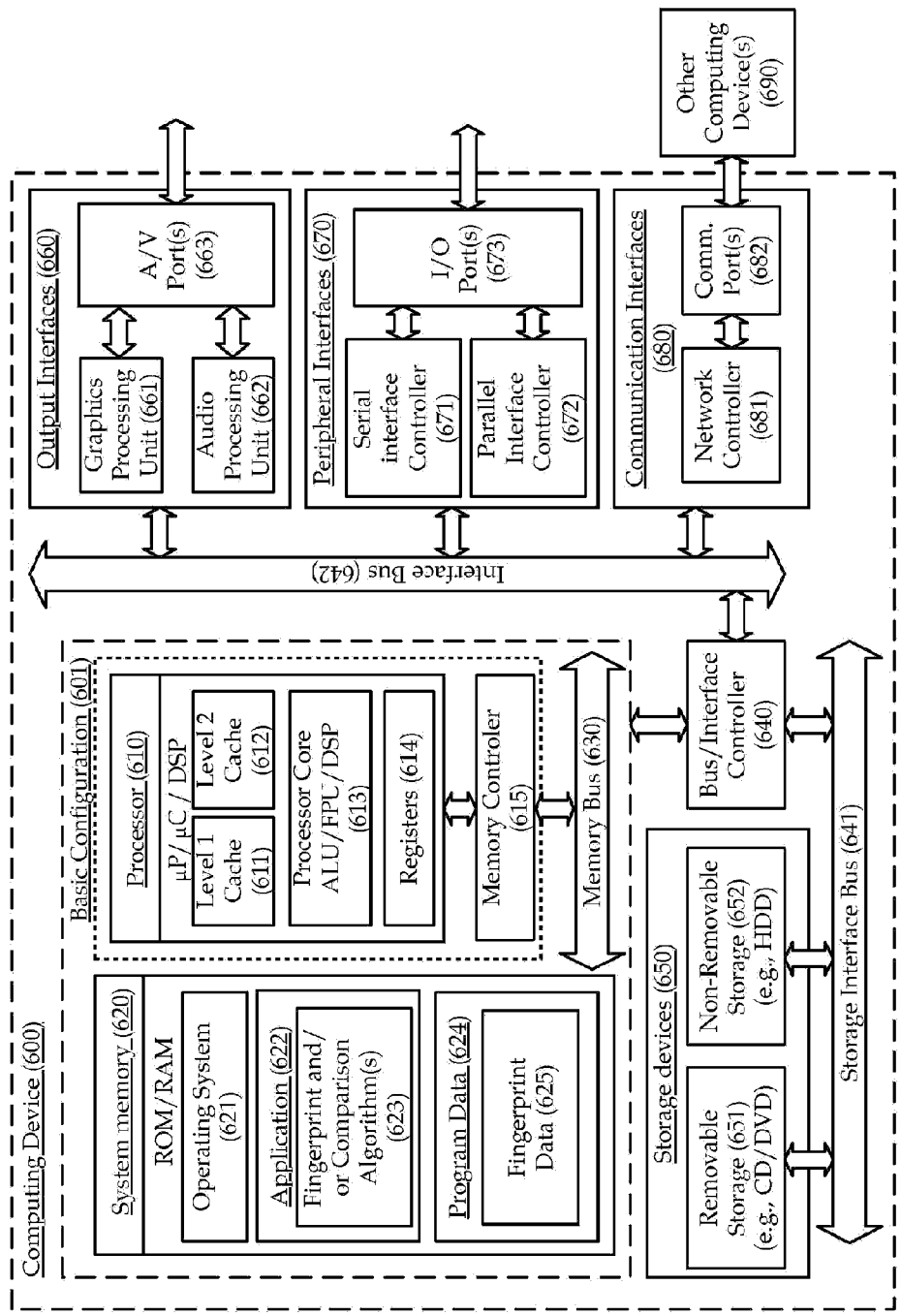
FIG. 6 is an illustration of an example computing device, all arranged in accordance with at least some embodiments of the present disclosure.

FIG. 6 is a block diagram illustrating an example computing device 600 in accordance with various implementations of the present disclosure. In a very basic configuration 601, computing device 600 typically includes one or more processors 610 and system memory 620. A memory bus 630 can be used for communicating between the processor 610 and the system memory 620.

Depending on the desired configuration, the system memory 620 can be of any type including but not limited to volatile memory (such as RAM), non-volatile memory (such as ROM, flash memory, etc.) or any combination thereof. System memory 620 typically includes an operating system 621, one or more applications 622, and program data 624. Application 622 may include instructions 623 that are arranged to perform the functions as described herein including the actions described with respect to the flow chart shown in FIG. 2. Program Data 624 may include fingerprint-related data 625, such as digital audio signal frame values, fingerprint vector data, etc. that may be useful for implementing instructions 623. In some examples, application 622 can be arranged to operate with program data 624 on an operating system 621 such that implementations of the present disclosure, as described herein, may be provided. This described basic configuration is illustrated in FIG. 6 by those components within dashed line 601.

Computing device 600 can have additional features or functionality, and additional interfaces to facilitate communications between the basic configuration 601 and any required devices and interfaces. For example, a bus/interface controller 640 can be used to facilitate communications between the basic configuration 601 and one or more data storage devices 650 via a storage interface bus 641. The data storage devices 650 can be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 620, removable storage 651 and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of device 600.

Computing device 600 can also include an interface bus 642 for facilitating communication from various interface devices (e.g., output interfaces, peripheral interfaces, and communication interfaces) to the basic configuration 601 via the bus/interface controller 640. Example output interfaces 660 include a graphics processing unit 661 and an audio processing unit 662, which can be configured to communicate to various external devices such as a display or speakers via one or more A/V ports 663. Example peripheral interfaces 670 include a serial interface controller 671 or a parallel interface controller 672, which can be configured to communicate with external devices such as input devices (e.g., keyboard, mouse, pen, voice input device, touch input device, etc.) or other peripheral devices (e.g., printer, scanner, etc.) via one or more I/O ports 673. An example communication interface 680 includes a network controller 681, which can be arranged to facilitate communications with one or more other computing devices 690 over a network communication via one or more communication ports 682. A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 600 can be implemented as a portion of a small-form factor portable (or mobile) electronic device such as a cell phone, smart phone, a personal data assistant (PDA), a personal media player device, a wireless web-watch device, a personal headset device, an application specific device, or a hybrid device that include any of the above functions. Computing device 600 can also be implemented as a personal computer including both laptop computer and non-laptop computer configurations or implemented in a workstation or a server configuration.

References made in this disclosure to the term "responsive to" or "in response to" are not limited to responsiveness to only a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It should also be understood that, the term "optimize" may include maximization and/or minimization. The term "minimization" and/or the like as used herein may include a global minimum, a local minimum, an approximate global minimum, and/or an approximate local minimum. Likewise, it should also be understood that, the term "maximization" and/or the like as used herein may include an global maximum, a local maximum, an approximate global maximum, and/or an approximate local maximum.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method for determining mobile Quality of Experience, the method comprising:
   receiving a first audio fingerprint generated from a digital audio signal, the first audio fingerprint being generated at a transmission source of the digital audio signal;
   receiving a second fingerprint generated from the digital audio signal received from the transmission source at a recipient of the digital audio signal, the recipient receiving the digital audio signal from the transmission source via a network; and
   determining a Quality of Experience (QoE) metric value based at least in part on a comparison between the first audio fingerprint and the second audio fingerprint generated from the digital audio signal, wherein a difference between the first audio fingerprint and the second audio fingerprint based on the comparison provides QoE metric value of characteristics including transmission medium quality or coding effects in mobile communications system.

2. The method of claim 1, wherein the digital audio signal comprises a Voice over IP (VoIP) signal.

3. The method of claim 1, wherein the determining the QoE metric value comprises determining the QoE metric value based at least in part on a comparison between a third audio fingerprint and at least one of the first audio fingerprint and the second audio fingerprint, wherein the third audio fingerprint is generated at the recipient of the digital audio signal in response, at least in part, to audio captured by at least one microphone located at the recipient of the digital audio signal.

4. The method of claim 3, wherein the transmission source of the digital audio signal comprises a first cellular telephone handset, and wherein the recipient of the digital audio signal comprises a second cellular telephone handset.

5. The method of claim 1, wherein the first audio fingerprint is generated at a first network node, wherein the recipient of the digital audio signal comprises a second network node, and wherein the second audio fingerprint is generated at the second network node.

6. The method of claim 5, wherein at least one of the first network node and/or the second network node comprises a server.

7. The method of claim 1, wherein the determining the QoE metric value based at least in part on a comparison between the first audio fingerprint and the second audio fingerprint comprises determining the QoE metric value based at least in part on a comparison between perceptual characteristics of the first audio fingerprint and perceptual characteristics of the second audio fingerprint.

8. The method of claim 7, wherein the perceptual characteristics comprise at least one of average zero crossing rate, estimated tempo, average spectrum, spectral flatness, prominent tones across one or more spectral bands, or bandwidth.

9. An article comprising a computer program product having stored therein instructions that, if executed, result in:
receiving a first audio fingerprint generated from a digital audio signal, the first audio fingerprint being generated at a transmission source of the digital audio signal;
receiving a second fingerprint generated from the digital audio signal received from the transmission source at a recipient of the digital audio signal, the recipient receiving the digital audio signal from the transmission source via a network; and
determining a Quality of Experience (QoE) metric value based at least in part on a comparison between the first audio fingerprint and the second audio fingerprint generated from the digital audio signal, wherein a difference between the first audio fingerprint and the second audio fingerprint based on the comparison provides QoE metric value of characteristics including transmission medium quality or coding effects in mobile communications system.

10. The article of claim 9, wherein the digital audio signal comprises a Voice over IP (VoIP) signal.

11. The article of claim 9, wherein the determining the QoE metric value comprises determining the QoE metric value based at least in part on a comparison between a third audio fingerprint and at least one of the first audio fingerprint and the second audio fingerprint, wherein the third audio fingerprint is generated at the recipient of the digital audio signal in response, at least in part, to audio captured by at least one microphone located at the recipient of the digital audio signal.

12. The article of claim 11, wherein the transmission source of the digital audio signal comprises a first cellular telephone handset, and wherein the recipient of the digital audio signal comprises a second cellular telephone handset.

13. The article of claim 9, wherein the first audio fingerprint is generated at a first network node, wherein the recipient of the digital audio signal comprises a second network node, and wherein the second audio fingerprint is generated at the second network node.

14. The article of claim 9, wherein the determining the QoE metric value based at least in part on a comparison between the first audio fingerprint and the second audio fingerprint comprises determining the QoE metric value based at least in part on a comparison between perceptual characteristics of the first audio fingerprint and perceptual characteristics of the second audio fingerprint.

15. The article of claim 14, wherein the perceptual characteristics comprise at least one of average zero crossing rate, estimated tempo, average spectrum, spectral flatness, prominent tones across one or more spectral bands, or bandwidth.

16. A system comprising:
one or more modules configured to:
receive a first audio fingerprint generated from a digital audio signal, the first audio fingerprint being generated at a transmission source of the digital audio signal;
receiving a second fingerprint generated from the digital audio signal received from the transmission source at a recipient of the digital audio signal, the recipient receiving the digital audio signal from the transmission source via a network; and
determine a Quality of Experience (QoE) metric value based at least in part on a comparison between the first audio fingerprint and the second audio fingerprint generated from the digital audio signal, wherein a difference between the first audio fingerprint and the second audio fingerprint based on the comparison provides QoE metric value of characteristics including transmission medium quality or coding effects in mobile communications system,
wherein the determining the QoE metric value based at least in part on a comparison between the first audio fingerprint and the second audio fingerprint comprises determining the QoE metric value based at least in part on a comparison between perceptual characteristics of the first audio fingerprint and perceptual characteristics of the second audio fingerprint,
wherein further, perceptual characteristics comprise at least one of average zero crossing rate, estimated tempo, average spectrum, spectral flatness, prominent tones across one or more spectral bands, or bandwidth.

17. The system of claim 16, wherein the determining the QoE metric value comprises determining the QoE metric value based at least in part on a comparison between a third audio fingerprint and at least one of the first audio fingerprint and the second audio fingerprint, wherein the third audio fingerprint is generated at the recipient of the digital audio signal in response, at least in part, to audio captured by at least one microphone located at the recipient of the digital audio signal.

* * * * *

UNITED STATES PATENT AND TRADEMARK OFFICE
CERTIFICATE OF CORRECTION

PATENT NO. : 8,989,395 B2  
APPLICATION NO. : 13/127798  
DATED : March 24, 2015  
INVENTOR(S) : Kruglick Page 1 of 1

It is certified that error appears in the above-identified patent and that said Letters Patent is hereby corrected as shown below:

On the title page

On Page 2, item 56 under "FOREIGN PATENT DOCUMENTS", in Column 1, Line 8, delete "WO 2010022303  A1  2/2010".

In the drawings

In Fig. 6, Sheet 6 of 6, for Tag "(615)", Line 1, delete "MEMORY CONTROLER" and insert -- MEMORY CONTROLLER --, therefor.

In the specification

In Column 1, below Title, Line 1, insert -- CROSS-REFERENCE TO RELATED APPLICATION
This Application is a U.S. National Stage Application under 35 U.S.C. § 371 of International Application No. PCT/US2010/059300, filed on December 7, 2010. --.

In Column 10, Line 26, delete "and or" and insert -- and/or --, therefor.

In Column 12, Line 16, delete "an global" and insert -- a global --, therefor.

In the claims

In Column 12, Line 48, in Claim 1, delete "second fingerprint" and insert -- second audio fingerprint --, therefor.

In Column 13, Line 33, in Claim 9, delete "second fingerprint" and insert -- second audio fingerprint --, therefor.

In Column 14, Line 34, in Claim 16, delete "second fingerprint" and insert -- second audio fingerprint --, therefor.

Signed and Sealed this  
Twentieth Day of October, 2015

Michelle K. Lee  
*Director of the United States Patent and Trademark Office*